INVENTORS
Nicola P. Rosato
Sven E. Siemen
BY
W. E. Thibodeau + A. W. Dew
ATTORNEYS Jan. 27, 1959  N. P. ROSATO ET AL  2,870,836
TREPANNED CORE CUTOFF TOOL
Filed May 19, 1955  3 Sheets-Sheet 2

INVENTORS
Nicola P. Rosato
Sven E. Siemen
BY
N. E. Thibodeau + A. W. Dew
ATTORNEYS Jan. 27, 1959 N. P. ROSATO ET AL 2,870,836
TREPANNED CORE CUTOFF TOOL
Filed May 19, 1955 3 Sheets-Sheet 3

INVENTORS
Nicolo P. Rosato
Sven E. Siemen
BY
W. E. Thibodeau + A. W. Dew
ATTORNEYS ововано
United States Patent Office 2,870,836
Patented Jan. 27, 1959

---

2,870,836

TREPANNED CORE CUTOFF TOOL

Nicola P. Rosato, Hyde Park, and Sven E. Siemen, Harvard, Mass., assignors to the United States of America as represented by the Secretary of the Army Application May 19, 1955, Serial No. 509,702

3 Claims. (Cl. 164—41)

(Granted under Title 35, U. S. Code (1952), sec. 266)

The invention described herein may be manufactured and used by or for the Government for governmental purposes without the payment of any royalty thereon.

This invention relates to the art of boring metallic bodies by trepanning and is directed more particularly to means for cutting off the trepanned core at a predetermined depth so as to form a well or dead end hole, such means being especially well adapted to cutting off the core of a workpiece made of titanium alloy.

The art of cutting bores in metallic bodies has been advanced considerably with the introduction of the trepanning method whereby bores are formed by a tool which cuts an annular groove in the workpiece to remove a solid core therefrom. This has meant a saving in time as the rate of penetration is increased materially over that required for solid bore drilling because less material in the workpiece has to be reduced to chips in forming the bore. A saving in material is also considerable, especially when the workpiece is made of critical, expensive material such as titanium, as the extracted core is of much greater value than the chips to which it would have been reduced in solid bore drilling.

In the past, however, it has not been possible to form a dead end hole by the trepanning method as there was no way of removing the core formed by the annular groove without completing such annular groove all the way through the workpiece.

It is, therefore, an object of this invention to provide means for cutting off the core formed by a trepanning tool at a predetermined depth and thereby produce a well or dead end hole.

It is another object of this invention to provide a trepanned core cutoff tool having a tube receivable by the trepanning groove and a cutter blade pivotally mounted to one end of such tube for cutting into the core along an arc, in which lies the axis of such core, when the workpiece is rotated.

It is a further object of this invention to provide a cutoff tool having duct means for directing oil under high pressure through the tube to the cutting surface of the cutting off tool to provide positive lubrication between the tool and the workpiece, to dissipate the heat generated during the cutting process and to provide a carrier for the chips formed in the cutting. This is especially important when the workpiece is of titanium alloy because titanium is a high friction material and extreme heat is generated in the tool and work when the chip is formed and removed, unless suitable cooling and lubrication is provided. If positive lubrication and cooling is not provided the protective film between the tool and the end has a tendency to boil off, permitting metal-to-metal contact therebetween. This creates a serious problem as titanium has a high chemical and physical affinity for other metals moving in contact with it. Therefore, galling and alloying takes place between the working areas of the tool and the titanium workpiece.

The specific nature of the invention as well as other objects and advantages thereof will clearly appear from a description of a preferred embodiment as shown in the accompanying drawings in which.

Figure 1:
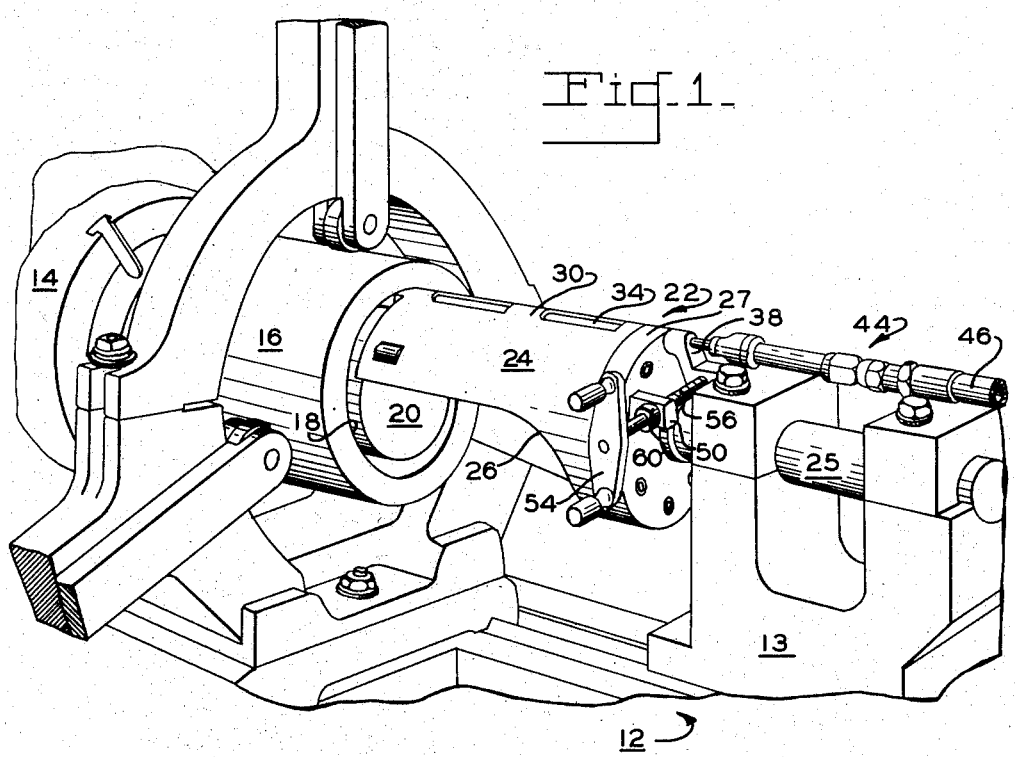
Fig. 1 is a reduced perspective view showing the trepanned core cutoff tool and workpiece installed in a turning lathe.
Figure 2:
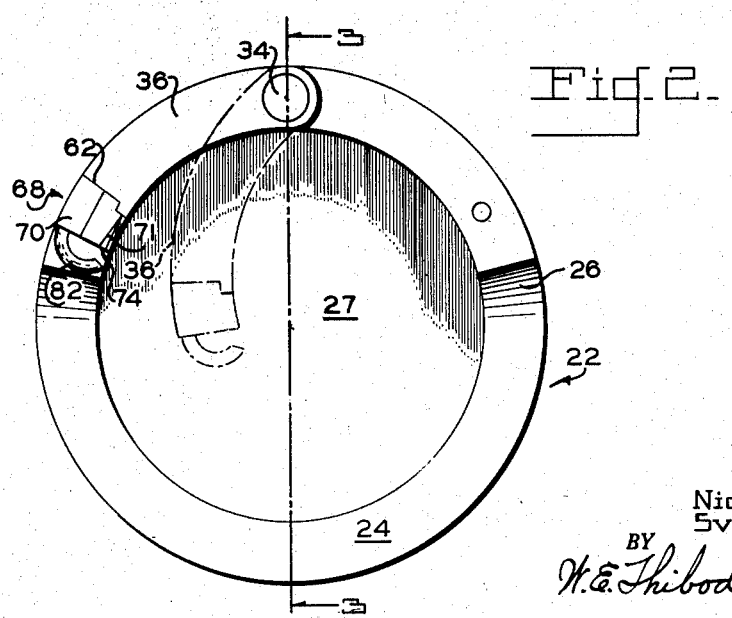
Fig. 2 is an end view of the trepanned core cutoff tool.
Figure 3:
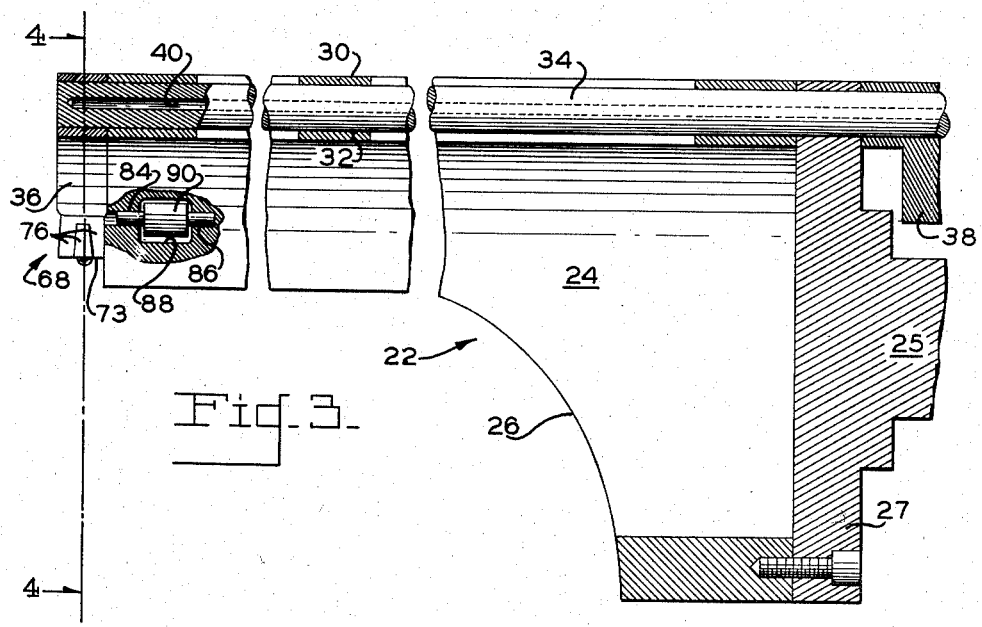
Fig. 3 is a view taken along line 3—3 of Fig. 2.

Shown in the figures is a turning lathe 12 provided with a carriage 13 and a chuck 14 for rotatably holding in a horizontal position a workpiece 16 which in the present embodiment is of an alloy of titanium. Extending longitudinally into workpiece 16 from the free end thereof is an annular groove 18 previously cut a predetermined depth by a trepanning tool (which is not shown nor a part of this invention) and a core 20 formed thereby.

Mounted to carriage 13, in longitudinal alignment with groove 18, is a cutoff tool 22 for cutting off core 20 at the predetermined distance. Cutoff tool 22 includes a cylindrical tube portion 24, which has a wall thickness slightly less than the width of groove 18 and of the same radius so as to be insertable therebetween into groove 18 without engagement with the surface walls thereof. Tube 24 is closed at one end by a plate 27 with a tailpiece 25 extending axially thereon for mounting to carriage 13. Tube 24 is longer than the depth at which core 20 is to be cut off and is cut away longitudinally, as noted at 26, to form a semicylindrical portion 30. Cutaway portion 26 is arranged to extend beyond the end of workpiece 16 when tube 24 is inserted the predetermined distance into groove 18 and cutoff tool 22 is mounted to carriage 13 so that such cutaway portion is disposed on the underside of such tube for a purpose to be hereinafter explained.

Extending longitudinally through the wall of tube 24, intermediate of portion 30, is a bore 32 which rotatably receives a shaft 34 arranged to extend beyond both ends of such tube. Fixedly mounted at one end, to the end of shaft 34 that extends beyond the free end of tube 24, is an arcuate blade 36 and mounted similarly to the opposite end is an arm 38. Such blade 36 and arm 38 are mounted to shaft 34 so as to be in slidable engagement with the respective ends of tube 24 whereby such blade and arm are maintained against longitudinal displacement.

Provided in shaft 34 is a blind hole 40 which extends axially thereinto, from the end to which arm 38 is mounted, to communicate with a duct 41 which extends radially from the end of such hole to a bore 42 in blade 36. Threadably mounted to the open end of hole 40 is a coupling 44 by which shaft 34 is connectable to a flexible conduit 46 which communicates with an oil pump (not shown) adapted to provide a supply of oil at an adjustable pressure up to 5000 p. s. i.

Pivotally mounted to the free end of arm 38 and to plate 27 adjacent the perimeter thereof are blocks 48 and 50, respectively, which have aligned bores therethrough that rotatably receive a rod 52. Rod 52 is provided with handle means 54 at one end and a threaded portion 56 at the other. The portion of rod 52 between handle means 54 and threaded portion 56 provides a bearing portion 58 cooperable with the bore of block 50 and the bore of block 48 is threaded to cooperate with threaded portion 56. A collar 60 is provided on bearing portion 58 between handle means 54 and block 50 whereby rotation of such handle means pivots arm 38 to rotate shaft 34 with the engagement of such collar with block 50 providing a rotatable stop for rod 52 when such handle means is operated to pivot arm 38 thereto.

Blade 36, as hereinbefore noted, is arcuate in configuration and such arcuation has the same radius as tube 24. Blade 36, also, is of substantially square cross-section with the sides being of approximately the same width as the thickness of the wall of tube 24 whereby such blade is alignable with the wall of semi-cylindrical portion 30 for insertion therewith into groove 18. The free end of blade 36 is terminated by a planar portion 62 which is disposed at right angles to the vertical axis of tube 24 when such blade extends diametrically downward. Extending into blade 36 from planar portion 62 and right angular thereto is a cylindrical hole 64 which is terminated by an end portion 66. The aforementioned bore 42 extends from hole 40 in shaft 34 to end portion 66 and a bore 67 similar in diameter to bore 42 extends from hole 64, adjacent end portion 66, to planar portion 62 between the orifice of hole 64 and the outside circumference of blade 36.

Figures 4, 5:
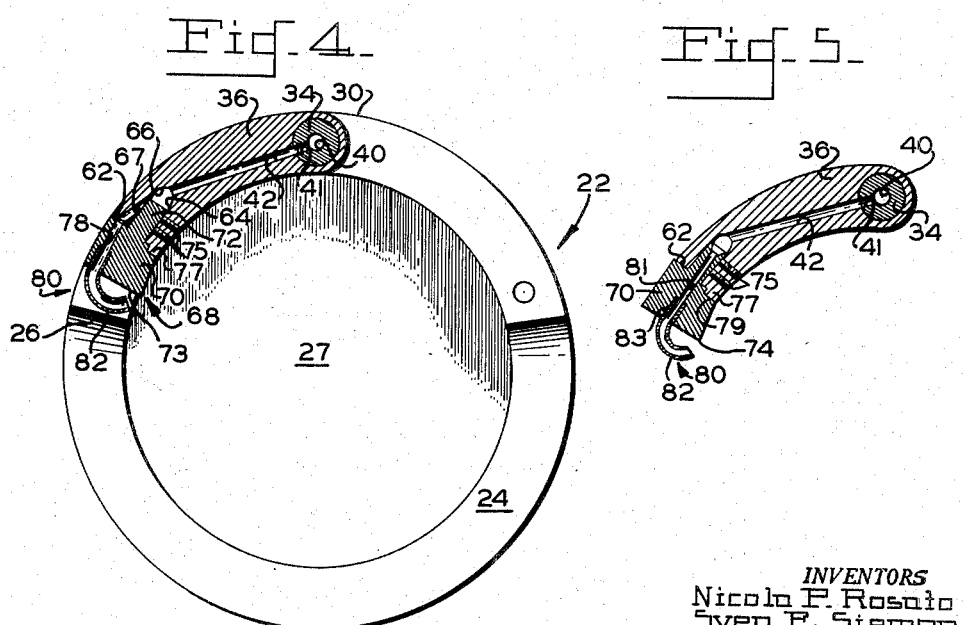
Fig. 4 is a view taken along line 4—4 of Fig. 3.
Fig. 5 is a cross-sectional view of the cutoff blade and cutting tool showing an alternate means of discharging oil to the working areas of such cutting tool.
Figure 6:
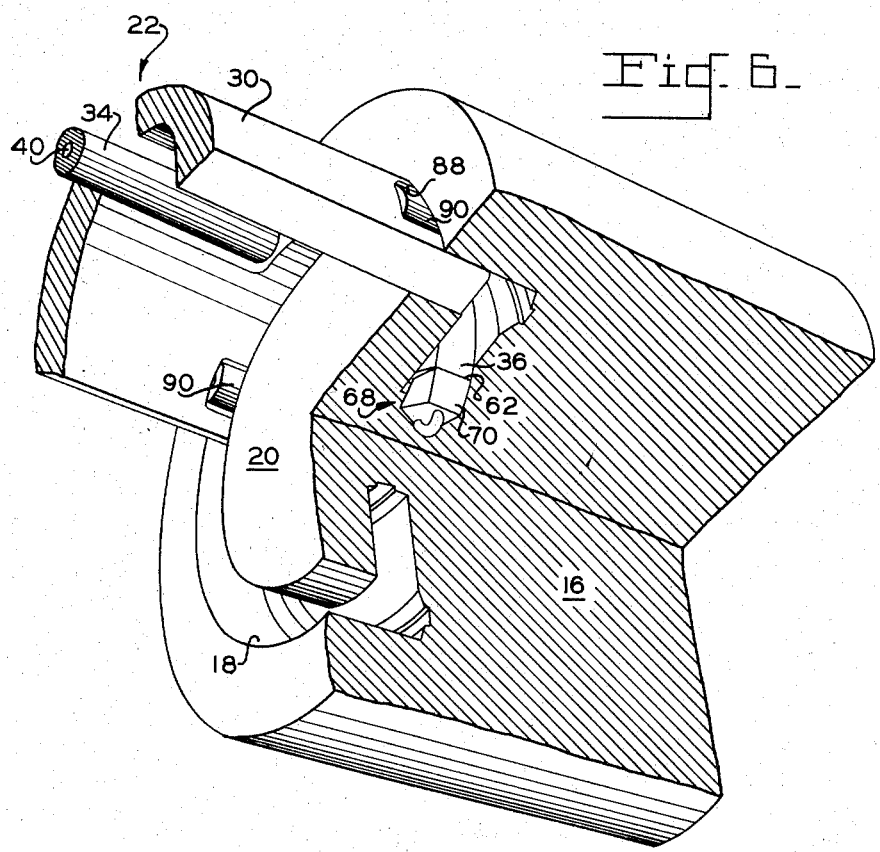
Fig. 6 is a perspective partially cross-sectioned view showing the method of cutting off the trepanned core.
Figure 7:
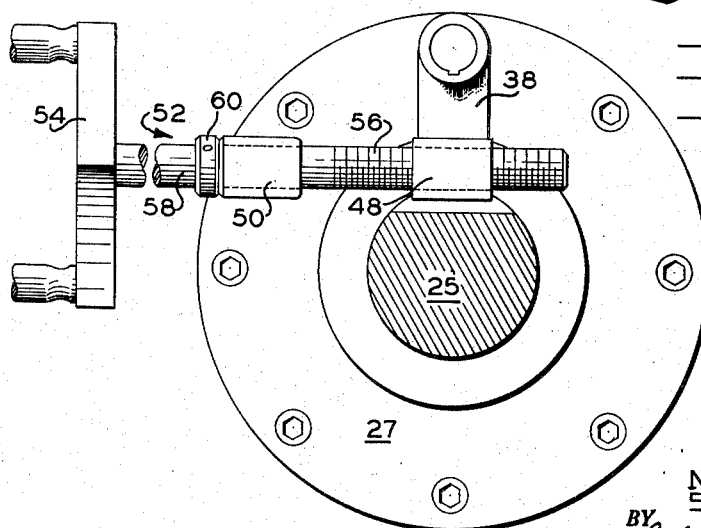
Fig. 7 is an end view of the cutoff tool.

Replaceably mounted in hole 64 is a cutting tool 68 having a head portion 70 and a stem portion 72 receivable by such hole. Cutting tool 68 is held securely to blade 36 by a pair of set screws 75, which are mounted transversely through such blade to be engageable with stem portion 72, and by a rectangular lug 77, on planar portion 62 of such blade, which is received by a mating recess 79 in head portion 70. Head portion 70 is substantially similar in cross-section to blade 36 and so is a longitudinal extension thereof. Provided at the junction of the side 71 of cutting tool 68, which is alignable with the inside wall surface of tube 24, and the free end of such tool, noted at 73, is a cutting edge 74. Such cutting edge 74 is formed by three portions 76 of approximately equal widths which lead away from such cutting edge along side 71. The central one of portions 76 projects from the side ones thereof whereby the chips removed by cutting edge 74 are divided into three portions for easy removal. A cylindrical stepped hole 78 extends from end 73 of cutting tool 68 to communicate with bore 67 and fixedly mounted in the larger diameter portion of such hole adjacent such end is a tube 80 which extends therefrom. The extending portion of tube 80, noted at 82, is bent to a U-shape and such U-shape is disposed toward cutting edge 74 so that the oil from such tube is discharged against end 73 to assure lubrication and cooling between such end and the chip formed by cutting edge 74. In the alternate means of discharging oil against end 73, illustrated in Fig. 5, a bore 81 extends axially through stem portion 72 and head portion 70 for the passage of oil therethrough, and tube 80 is mounted in a counterbore 83 which extends inwardly from the orifice of such bore in end 73.

Blade 36 and arm 38 are so mounted to shaft 34 that when such arm is drawn toward block 50 by handle means 54 such blade is pivoted from a position in alignment with the wall of tube 24 toward the axis thereof. The length of blade 36 and attached cutting tool 68 is such that when such blade is pivoted, cutting edge 74 swings in an arc which passes through the axis of tube 24. Extending longitudinally into semicylindrical portion 30 from the free end thereof is a pair of cylindrical holes 84 which are spaced equidistant from bore 32 and adjacent the longitudinal sides of such semicylindrical portion. Received by holes 84 are cylindrical axles 86 upon each of which there is mounted, in a suitable recess 88 therefor, a roller 90.

Operation

When workpiece 16 has been trepanned to the predetermined depth at which core 20 is to be cut off the trepanning tool (not shown) is removed from carriage 13 and cutoff tool 22 is installed in its place. Cutoff tool 22 is installed so that semicylindrical portion 30 is disposed on the top side and handle means 54 is rotated to pivot blade 36 into alignment with the adjacent wall of semicylindrical portion 30. Carriage 13 is then moved up to workpiece 16 so as to insert semicylindrical portion 30 into groove 18 to where cutting tool 68 is at the predetermined distance. As hereinbefore explained, when cutting tool 68 is positioned at the proper depth, cutaway portion 26 extends beyond the free end of workpiece 16 to provide an outlet for the oil and chips which pass along such cutaway portion during the cutting operation.

The oil pump (not shown) is put into operation and adjusted to provide oil at approximately 2400 p. s. i. The oil from the pump proceeds through flexible conduit 46 and the passageways therefor in shaft 34, blade 36 and cutting tool 68 to be discharged from tube 80 onto end 73 of such cutting tool. Lathe 12 is then started so as to rotate workpiece 16 and handle means 54 is turned to pivot blade 36 towards core 20 so that cutting edge 74 cuts thereinto. The flexibility of conduit 46 permits such rotation of shaft 34.

Through the concentration of the oil under extreme pressure where most needed, which is at the bearing surface on end 73 where the chip formed by cutting edge 74 rides across before breaking off, there is assured an immediate replacement of an oil film on such bearing surface in event of boiling off. The rapid passage of oil over the working areas, because of the high pressure, also assures an efficient cooling and lubrication thereof to prevent alloying and galling between the titanium metal of workpiece 16 and the metal of cutoff tool 22, and an efficient evacuation of the chips. Also, rollers 90, which are disposed so as to bear the load produced during the cutting operation, are lubricated by the spray of oil from tube 80 to prevent galling between tube 24 and workpiece 16.

Cutting is continued by turning handle means 54 until core 20 is nearly cut through. Cutting is stopped before core 20 is cut entirely through so as to prevent such core from dropping and jamming. Blade 36 is then pivoted to align with the walls of tube 24 and cutoff tool 22 is withdrawn from workpiece 16. The final detachment of core 20 from workpiece 16 is made by the insertion of a pry bar in groove 18 to force such core which readily breaks off.

From the foregoing, it is clearly apparent that there is herein provided a novel means of removing the core formed by trepanning so as to form a dead end hole.

Although a particular embodiment of the invention has been described in detail herein, it is evident that many variations may be devised within the spirit and scope thereof and the following claims are intended to include such variations.

We claim:

1. A device for cutting off from a workpiece a core formed therein by an annular groove, said device including means for rotating the workpiece, a nonrotating tube having one end insertable into the annular groove, a longitudinal shaft rotatably mounted through the wall of said tube so as to extend beyond both ends thereof, a cutting tool mounted to one of said extending ends of said shaft for cutting radially through the core, an arm mounted to the other one of said extending ends, said cutting tool having an arcuate configuration conforming to the radius of said tube so as to align therewith for insertion into the groove, passageway means through said shaft and said cutting tool for conducting oil therethrough, tube means disposed on said cutting tool for communication with said passageway means to conduct the oil therefrom against the working areas of said cutting tool, and screw means cooperating with said arm for pivoting said cutting tool against the core.

2. A device for cutting off from a workpiece a core formed therein by an annular groove, said device including means for rotating the workpiece, a nonrotating tube having one end insertable into the annular groove, a longitudinal shaft rotatably mounted through the wall of said tube so as to extend beyond both ends thereof, a cutting tool mounted to one of said extending ends of said shaft for cutting radially through the core, an arm mounted to the other one of said extending ends, said cutting tool having an arcuate configuration conforming to the radius of said tube so as to align therewith for insertion into the groove, passageway means through said shaft and said cutting tool for conducting oil therethrough, tube means disposed on said cutting tool for communication with said passageway means to conduct the oil therefrom against the working areas of said cutting tool, a pair of rollers mounted longitudinally in said tube for bearing the thrust thereagainst produced by the cutting of the core by said cutting tool, and screw means cooperating with said arm for pivoting said cutting tool against the core.

3. A device for cutting off from a workpiece a core formed therein by an annular groove, said device including means for rotatably holding the workpiece in a horizontal position, a cutoff tool including a tube insertable into the groove and provided with a longitudinal clearance for the discharge of oil and chips from the groove, a semicylindrical portion formed by said clearance, a tailpiece extending from said tube opposite said semicylindrical portion, means engageable with said tailpiece for holding said cutoff tool against rotation and in longitudinal alignment with the groove, a shaft mounted for rotation longitudinally through the wall of said tube, said shaft extending beyond the ends of said tube to form a first extending portion adjacent the end of said semicylindrical portion and a second extending portion adjacent said tailpiece, a blade mounted on the said first extending portion, said blade having an arcuate configuration conforming to the radius of said semicylindrical portion so as to be alignable therewith for insertion into the groove, a cutting tool replaceably mounted to the end of said blade for cutting through the core when said blade is rotated thereagainst, an arm mounted to said second extending portion, a bore extending through said shaft to communicate with passageway means through said blade and said cutting tool, a flexible conduit connectible with said shaft for supplying oil to said bore, a U-shaped tube fixedly mounted at one end in the end of said passageway means in said cutting tool for directing the oil toward the working areas of said cutting tool, a pair of rollers longitudinally mounted in said semicylindrical portion on opposite sides of said bore to bear the thrust against said tube during the cutting of the core by said cutting tool, and screw means cooperating with said arm for pivoting said cutting tool against the core.

References Cited in the file of this patent

UNITED STATES PATENTS

| | | |
|---|---|---|
| 9,961 | Walbach | Aug. 23, 1853 |
| 162,163 | Grisbee | Apr. 20, 1875 |
| 887,310 | Chamberlin | May 12, 1908 |
| 1,115,010 | Patrosio | Oct. 27, 1914 |
| 1,918,642 | Hall | July 18, 1933 |
| 2,058,360 | Schmidt | Oct. 20, 1936 |